United States Patent [19]

Evans et al.

[11] 4,016,716
[45] Apr. 12, 1977

[54] GAS TURBINE ENGINE DUMP VALVE

[75] Inventors: Duane E. Evans, Peoria; Thomas M. Tabor, East Peoria; David A. Tyler, Peoria, all of Ill.

[73] Assignee: Caterpillar Tractor Co., Peoria, Ill.

[22] Filed: Apr. 20, 1970

[21] Appl. No.: 30,081

[52] U.S. Cl. .......................... 60/39.09 R; 137/107; 251/62; 60/39.28 R

[51] Int. Cl.² ...................... F02G 3/00; F02C 9/04

[58] Field of Search .................. 60/39.28, 39.09; 137/107, 117

[56] References Cited
UNITED STATES PATENTS

| | | | |
|---|---|---|---|
| 2,814,180 | 11/1957 | Hession | 60/39.09 |
| 2,846,845 | 8/1958 | Parker | 60/39.09 |
| 3,103,229 | 9/1963 | Smith | 137/107 |

*Primary Examiner*—Clarence R. Gordon
*Attorney, Agent, or Firm*—Phillips, Moore, Weissenberger, Lempio & Majestic

[57] ABSTRACT

A valve actuated in response to a drop in fuel pressure across a fuel supply valve that will drain the fuel from a fuel line but not leak when exposed to high fuel pressures during normal operation. The dump valve is particularly applicable to the draining of fuel from a gas turbine engine fuel nozzle line after shutoff of the engine fuel supply valve.

11 Claims, 3 Drawing Figures

GAS TURBINE ENGINE DUMP VALVE

BACKGROUND OF THE INVENTION

Residual fuel left in a gas turbine engine fuel nozzle supply line after engine shutdown in subject to high soak back temperatures. As a result, the residual fuel tends to coke and/or clog up the fuel nozzle or coke the combustor can walls, thereby detrimenting engine performance on subsequent operation. To obviate these difficulties it is desirable to drain or dump the residual fuel from the nozzle supply line in response to engine shutdown.

Although numerous elaborate gas turbine engine fuel control systems have been devised, none have included a satisfactory nozzle supply line residual fuel dumping feature. Past attempts to accomplish drainage of the residual fuel have generally involved incorporation of the dumping feature in the nozzle fuel supply valve. In this regard, the supply valve may include a valved drain passage in addition to a valved supply passage which are operable in mutually complementary relationship. In other words, the drain passage is closed when the supply passage is open to supply fuel to the nozzle. Conversely, when the supply passage is closed to block fuel from the nozzle and shut down the engine, the drain passage is open to dump the residual fuel from the nozzle fuel line.

However, if a spool valve is employed for such a dual function, leakage to the drain passage is too great at the high fuel pressures which exist during normal engine operation. If a poppet valve is employed, a relatively large solenoid is required to pull the valve into position against the high fuel pressures. Hence, prior art approaches to drain the nozzle fuel line upon shutdown of a gas turbine engine have been unsatisfactory from the standpoint of the excessive fuel leakage experienced during normal engine operation and/or the cost of providing the fuel dumping feature, among other things.

SUMMARY OF THE INVENTION

The present invention relates to a dump valve especially useful for draining residual fuel from the nozzle fuel supply line of a gas turbine engine during periods of engine shutdown, which valve is characterized by a positive valving action commensurate with negligible leakgage when exposed to high fuel pressures existing during normal engine operation, and by the lack of a directly associated actuating solenoid thereby resulting in a relatively low cost of construction.

In the accomplishment of the foregoing, and other advantages and features, the dump valve of the present invention generally includes a body having an inlet port, an outlet or drain port, a valve seat circumscribing an opening communicating the inlet and drain ports, and a pilot port. A spool slidable mounted in the body is provided with a valve tip and is spring loaded to normally resiliently urge the tip into engagement with the seat to thereby block communication between the inlet and drain ports.

In addition, means are provided to communicate the inlet and pilot ports with opposed faces of the spool, the face thereby exposed to the pressure at the inlet port being situated such that the force due to the pressure acting thereon aids the spring loading force whereas the force due to the pilot port pressure acting on the opposed face opposes same.

The dump valve may be connected across a nozzle fuel supply valve of a gas turbine engine with the inlet port connected to the nozzle side of the supply valve and the pilot port connected to the high pressure inlet side thereof. With the supply valve open during normal engine operation, the balance of forces acting on the spool is such as to positively seat the valve tip and thereby effectively prevent leakage of fuel between the inlet and drain ports. However, with the supply valve closed to shut down the engine, the drop in pressure thereacross effects a reversal of the balance of forces acting on the spool, thereby unseating the valve tip and establishing communication between the inlet and drain ports to drain the residual fuel from the nozzle fuel line.

BRIEF DESCRIPTION OF THE DRAWINGS

The invention is illustrated in the accompanying drawings, wherein.

DETAILED DESCRIPTION OF THE INVENTION

Figure 1:
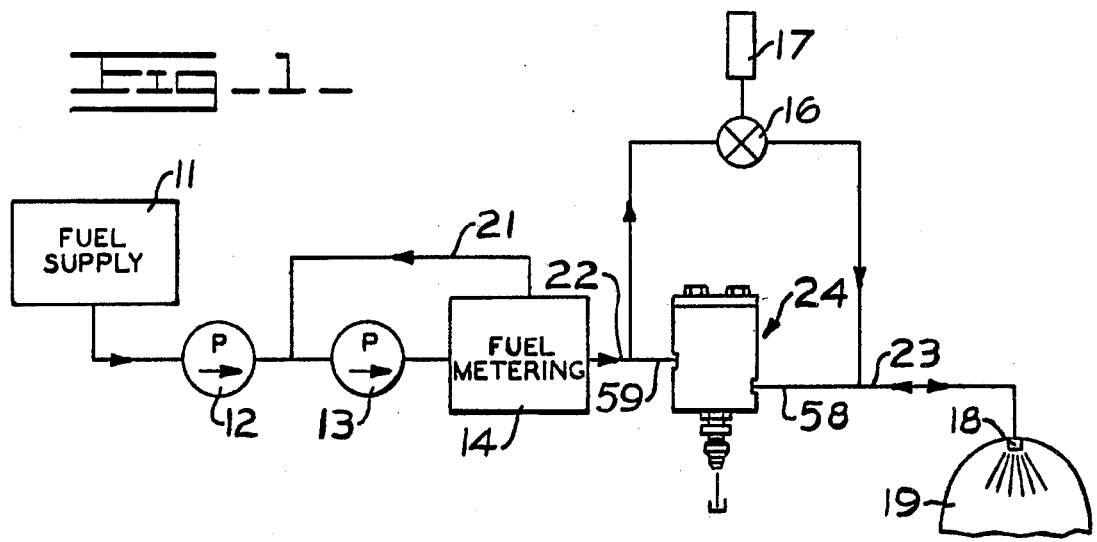
FIG. 1 is a schematic diagram of a gas turbine engine nozzle fuel supply system incorporating a dump valve in accordance with the present invention.

Referring now to FIG. 1 in detail, a fuel supply system for a gas turbine engine includes a fuel supply 11 which supplies fuel through a transfer pump 12, high pressure pump 13, fuel metering or equivalent control device 14, and on-off supply valve 16 actuated by means of solenoid 17, to a nozzle 18 which introduces the fuel into a combustion chamber 19.

The metering device 14 is provided with a bypass line 21 which is connected to the inlet side of high pressure pump 13. The metering device functions to bypass fuel via line 21 in inverse relation to the amount of fuel required at the nozzle 18 to thereby supply the proper amount of fuel via the outlet line 22 of the metering device, supply valve 16, and line 23 to the nozzle.

The solenoid 17 opens supply valve 16 during engine start-up as a function of a timed sequence, the rotating turbine assembly reaching a predetermined speed, or being driven by a separate starter mechanism. With the supply valve in open position, the proper amount of fuel determined by metering device 14 is supplied via line 23 to the nozzle. When the supply valve is in closed position, fuel is blocked from line 23 to the nozzle to thereby shut down the engine.

Inasmuch as the residual fuel in line 23 when the engine has been shut down would normally tend to coke and/or clog up the nozzle 18 or coke the combustor can walls, a dump valve 24 in accordance with the present invention is provided in the fuel supply system to drain such residual fuel upon closure of supply valve 16.

Figure 2:
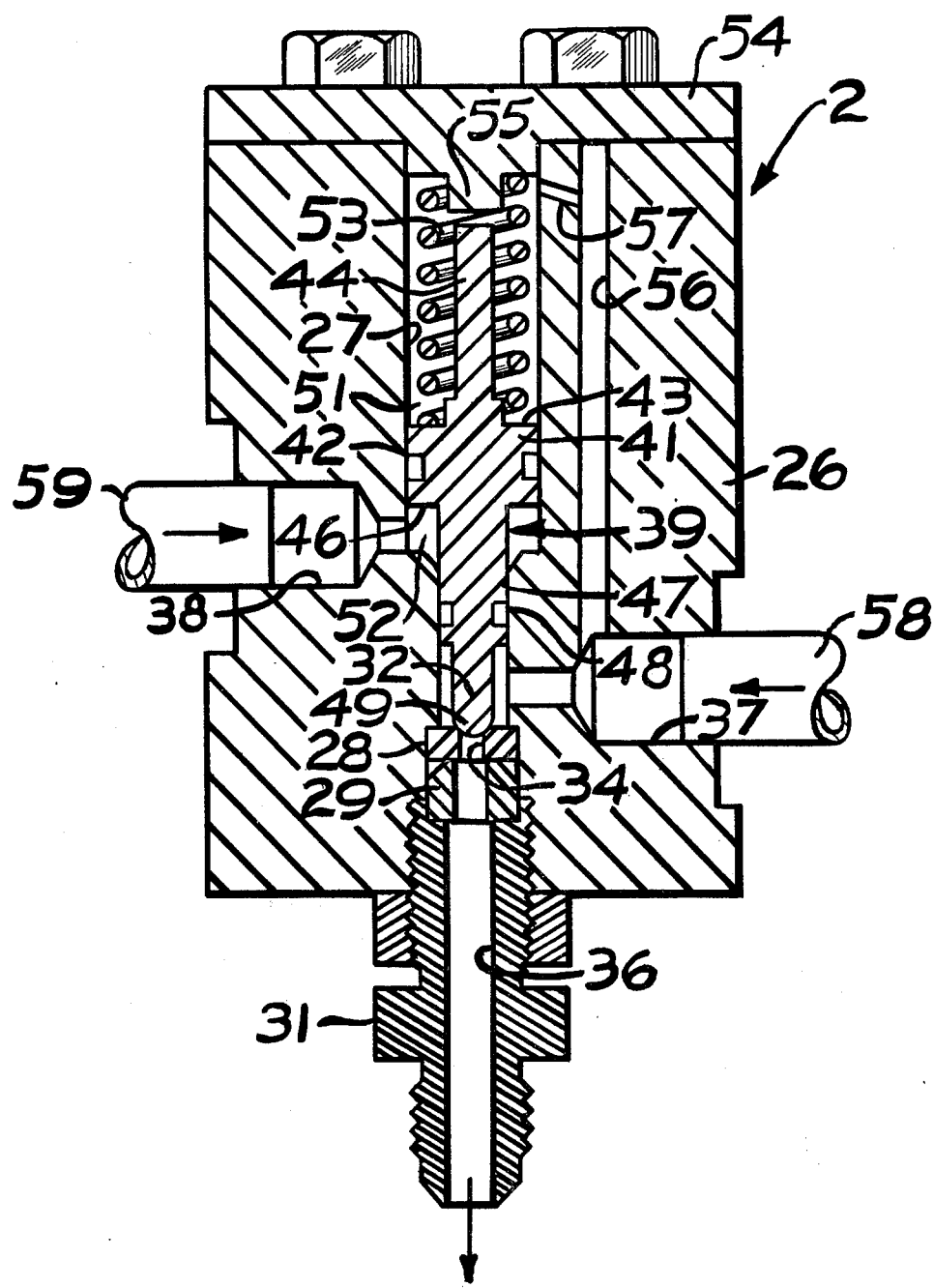
FIG. 2 is a central sectional view through the dump valve.

More particularly, as shown in FIG. 2, the dump valve 24 includes a valve body 26 having a bore 27 extending therethrough. The bore is preferably stepped at a location intermediate its length whereby one end portion is of enlarged diameter and the other end portion is of reduced diameter. A seal element 28, retainer 29, and outlet fitting 31 are mounted in the reduced portion of the bore. The seat element has a precision ground face recess defining a valve seat 32 circumscribing a central opening 34 extending therethrough.

Opening 34 communicates with aligned passages through retainer 29 and fitting 31 which define a drain port 36 of the valve.

The body 26 is provided with an inlet port 37 which preferably extends radially thereinto and communicates with the reduced portion of bore 27 at a position adjacent valve seat 32. The opening 34 centrally of the seat thereby communicates the inlet port 37 with the drain port 36. In addition, a pilot port 38 is provided which preferably extends radially into the body and communicates with the enlarged portion of bore 27 adjacent its stepped termination in the reduced portion of the bore.

Within the bore 27 there is slidably mounted a valve spool 39 which is arranged to open or close communication between the inlet and drain ports 37 and 36 in accordance with the pressure differential across the pilot and inlet ports 38 and 37.

More particularly, the spool includes an enlarged central portion 41 peripherally fitted with a seal ring 42 so as to be sealingly slidably engagable with the wall of the enlarged portion of the bore 27. The central portion 41 is inwardly stepped at one end face 43 to define a stem 44 projecting coaxially therefrom through the enlarged portion of the bore in inwardly spaced relation to the wall thereof.

The central portion is inwardly stepped at the opposite end face 46 to define a reduced portion 47 projecting coaxially therefrom into the reduced portion of the bore. Reduced portion 47 is peripherally fitted with a seal ring 48 to facilitate sealing sliding engagement with the wall of the reduced portion of the bore. The reduced portion is inwardly stepped adjacent the inlet port 37 to provide communicating clearance between such port and valve seat 32, and the end of the reduced portion is tapered to define a valve tip 49 sealably engagable with the seat.

Seal ring 48 serves to seal against communication between the pilot port 38 and the drain and inlet ports 36 and 37. Seal ring 42 functions to prevent communication between chambers 51 and 52 defined in the enlarged portion of bore 27 on opposite sides of the enlarged central portion 41 of spool 39.

In order to spring load the spool 39 to normally resiliently maintain valve tip 49 in sealed engagement with the valve seat 32, a spring 53 is preferably disposed co-axially about stem 44 to act between a valve head 54 secured to the end of the body 26 proximate the enlarged portion of bore 27, and face 43 of the enlarged central portion 41 of the spool.

More particularly, the head is preferably formed with a boss 55 which projects coaxially into the enlarged portion of the bore and is circumferentially engaged by the end of the spring. The boss is spaced from the end of stem 44 when the spool is in its normal position and serves as a stop to limit spool displacement when the tip 49 is unseated from seat 32.

In accordance with the particularly salient aspects of the invention, the inlet port 37 is communicated with chamber 51 and thus face 43 of spool 39, while pilot port 38 is communicated with chamber 52 and thus the opposite face 46 of the spool. Direct communication is established between the pilot port and chamber 52 by virtue of such port extending into the enlarged portion of the bore 27 adjacent its stepped termination in the reduced bore portion, i.e., the proximal end of the enlarged bore portion with respect to spool face 46.

Communication between the inlet port 37 and chamber 51 is preferably established by means of a passage 56 extending longitudinally of the body 26 between such port and head 54, and an orifice 57 extending between the passage and chamber 51.

With the valve thus provided it is to be noted that pressure at the inlet ports 37 appears in chamber 51 and acts on spool face 43 while pressure at the pilot port 38 appears in chamber 52 and acts on spool fact 46. Consequently, a force given by the inlet port pressure times the area of face 43 is applied to spool 39 in aiding relation to the force of spring 53, which forces are directed to maintain the valve tip 49 in seated position. A force given by the pilot port pressure times the area of face 46 is applied to spool 39 in opposing relation to the above noted forces and is thereby directed to unseat the valve tip 49.

Hence, when the inlet port and pilot port pressures are substantially the same, the balance of forces acting on the spool is such as to seat the valve tip and block communication between the inlet port and drain port. Conversely, when the inlet port pressure is significantly less than the pilot port pressures, the balance of forces is such as to unseat the valve tip and establish communication between the inlet port and drain port.

With regard to the employment of the dump valve 24 to drain fuel from the nozzle line 23 upon engine shutdown by closure of supply valve 16, the inlet port 37 is connected as by means of pipe 58 to the junction between line 23 and outlet side of the supply valve, while the pilot port 38 is connected as by means of pipe 59 to the junction between the outlet line 22 of metering device 14 and the inlet side of the supply valve.

As a result, when the supply valve is open during normal engine operation substantially no pressure differential exists across the supply valve and hence between the pilot and inlet ports. The force balance on the spool 39 acts to positively seat the valve tip 49 such that leakage of the high pressure fuel at the inlet port 37 to the drain port 36 is negligible. However, when the supply valve is closed to shut down engine operation, a substantial pressure differential exists thereacross and therefore between the pilot and inlet ports. The valve tip 49 is responsively displaced to unseated position to drain the residual fuel in line 23 via pipe 58 to the drain port 36.

Of course, when the supply valve 16 is again opened to restart the engine, the valve tip is again seated to block communication between the inlet port and drain port. It is important to note that the orifice 57 is sized small in order to provide some damping as the fuel enters chamber 51 and thereby prevent rapid closure of the valve which could damage seat 32.

Figure 3:
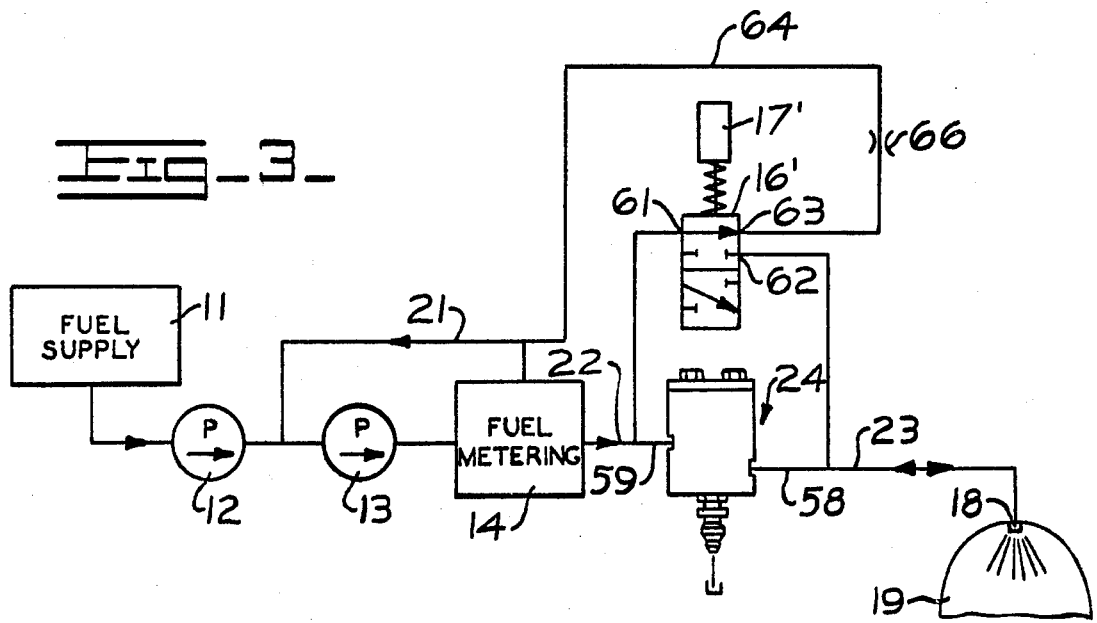
FIG. 3 is a view similar to FIG. 1, but of a modified form of fuel supply system.

Referring now to FIG. 3, the dump valve 24 will be seen to be incorporated in a somewhat modified form of fuel system from that depicted in FIG. 1 and hereinbefore described. More particularly, the supply valve 16 and actuating solenoid 17 are replaced by a two-way supply valve 16' and actuating solenoid 17' to facilitate venting of high pressure pump 13 during the coast down period. Such venting avoids running of the pump against the ultimate relief of the pressure relief valve normally included in the metering device 14, thus prolonging pump life.

More particularly, valve 16' includes an inlet port 61 and two outlet ports 62 and 63 which are individually selectively connected to the inlet port by actuation of the solenoid 17'. Inlet port 61 is connected to the outlet line 22 of metering device 14 and outlet port 62 is connected to fuel line 23 leading to the nozzle 18.

Outlet port 63 is connected by means of line 64 containing a restrictor 66 to the bypass line 21 leading to the inlet side of pump 13. The pipes 58 and 59 to inlet and pilot ports 37 and 38 of dump valve 24 are respectively connected to the junction between lines 23 and supply valve port 62 and the junction between line 22 and supply valve port 61.

Thus, the dump valve operates in a manner similar to that previously described with respect to the system of FIG. 1. When the supply valve 16' is actuated to connect inlet port 61 to outlet port 62, and thereby supply fuel to nozzle 18 during normal engine operation, the pressure differential across the pilot and inlet ports is negligible, whereby valve tip 49 is in seated position to block communication between the inlet port and drain port.

When the supply valve is actuated to connect inlet port 61 to outlet port 63 and thereby terminate the supply of fuel to nozzle 18 and shut down the engine, the fuel from metering device 14 is bypassed via lines 64 and 21 to the inlet side of pump 13 to facilitate venting thereof during coast-down. The restrictor 66 enables sufficient fuel pressure to exist at pilot port 38 to establish a pressure differential between the pilot port and inlet port which unseats valve tip 49. Communication between the inlet port and drain port is thus established to drain the residual fuel from line 23.

It will be appreciated that in both forms of fuel system previously described, the dump valve 24 is actuated in response to a pressure differential or drop established by actuation of a second valve, namely supply valve 16 or 16'. The dump valve hence does not entail the use of a solenoid for its direct actuation and consequently is relatively inexpensive.

Although the present invention has been described hereinbefore and is illustrated in the accompanying drawings with respect to preferred embodiments, it will be appreciated that numerous changes and modifications may be made therein without departing from the true spirit and scope of the invention, and thus it is not intended to limit the invention except by the terms of the appended claims.

What is claimed is:

1. A fuel system for a gas turbine engine comprising a fuel supply, fuel metering means, pump means connecting said supply to said metering means, a fuel supply valve including an inlet port and an outlet port, said valve operable to selectively open or close communication between said inlet and outlet ports, a nozzle for introducing fuel to a combustion chamber, a fuel line connecting said metering means to said inlet port, a second fuel line connecting said outlet port to said nozzle, and a dump valve, said dump valve comprising a body having drain, inlet, and pilot ports and a valve seat circumscribing an opening communicating said inlet and drain ports of said dump valve, a spool slidably mounted in said body and having a valve tip engagable with said seat, means spring loading said spool to normally resiliently engage said tip with said seat, means communicating said inlet and pilot ports of said dump valve with said first and second opposed faces of said spool to expose same to pressures at said inlet and pilot ports of said dump valve, said first face being disposed such that force due to pressure acting thereon is directed to aid the force of the spring loading means, said second face being disposed such that force due to pressure acting thereon is directed to oppose the force of said spring loading means, and means connecting said pilot and inlet ports of said dump valve to said inlet and outlet ports of said supply valve.

2. A fuel supply system according to claim 1, further defined by said seat being a recess and said tip being bevelled to mate with the seat recess.

3. A fuel supply system according to claim 1, further defined by said body having a bore extending therethrough, said bore stepped intermediate its length whereby one end portion is of enlarged diameter and the other end portion is of reduced diameter, said seat disposed in the reduced portion of said bore, means defining said drain port in the outer end of said reduced portion of said bore, said inlet port of said dump valve communicating with said reduced portion of said bore at a point adjacent said seat on the opposite side thereof from said drain port, said spool having an enlarged central portion sealingly slidably engagable with the wall of said enlarged portion of said bore, the opposite faces of said central portion of said spool being said first and second opposed faces of said spool, said central portion of said spool dividing said enlarged portion of said bore into first and second chambers respectively communicating with said first and second spool faces, said central portion of said spool inwardly stepped at said first face to define a stem projecting coaxially of said first chamber, said central portion inwardly stepped at said second face to define a reduced portion projecting coaxially of said second chamber and through said reduced portion of said bore in sealing sliding engagement with the wall thereof, the end of said reduced portion of said stem defining said valve tip, said spring loading means being a spring disposed coaxially about said stem and acting between a head wall at the outer end of said enlarged portion of said bore and said first face, said dump valve pilot port communicating with said second chamber, and said body having a passage communicating said dump valve inlet port and said first chamber.

4. A fuel supply system according to claim 3, further defined by said passage having an orifice adjacent its point of communication with said first chamber.

5. A fuel supply system according to claim 3, further defined by said seat being a recess and said tip being bevelled to mate with said seat recess.

6. A fuel supply system according to claim 5, further defined by said passage having an orifice adjacent its point of communication with said first chamber.

7. A fuel supply system according to claim 1, further defined by said supply valve having a second outlet port, said supply valve being operable to individually selectively communicate said first and second outlet ports thereof with said inlet port thereof, and a line including a restrictor connecting said second outlet port of said supply valve to the inlet side of said pump means.

8. A fuel supply system according to claim 7, further defined by said seat being a recess and said tip being bevelled to mate with said seat recess.

9. A fuel supply system according to claim 3, further defined by said supply valve having a second outlet port, said supply valve being operable to individually selectively communicate said first and second outlet ports thereof with said inlet port thereof, and a line including a restrictor connecting said second outlet port of said supply valve to the inlet side of said pump means.

10. A fuel supply system according to claim 9, further defined by said passage having an orifice adjacent its point of communication with said first chamber.

11. A fuel supply system according to claim 9, further defined by said seat being a recess and said tip being bevelled to mate with said seat recess.

* * * * *